United States Patent
Teague et al.

(10) Patent No.: US 9,910,828 B2
(45) Date of Patent: Mar. 6, 2018

(54) SPECTROMETER FOR PERSONAL CONTEXT

(71) Applicant: QUALCOMM Incorporated, San Diego, CA (US)

(72) Inventors: Edward Harrison Teague, San Diego, CA (US); Ashwin Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 13/797,396

(22) Filed: Mar. 12, 2013

(65) Prior Publication Data

US 2014/0278238 A1   Sep. 18, 2014

(51) Int. Cl.
| | |
|---|---|
| G06F 17/18 | (2006.01) |
| G01J 1/42 | (2006.01) |
| G01J 3/46 | (2006.01) |
| H04M 1/725 | (2006.01) |
| G06F 1/16 | (2006.01) |
| G06F 1/32 | (2006.01) |

(52) U.S. Cl.
CPC ............ G06F 17/18 (2013.01); G01J 1/4204 (2013.01); G01J 3/46 (2013.01); G06F 1/1684 (2013.01); G06F 1/3206 (2013.01); H04M 1/72569 (2013.01); H04M 2250/12 (2013.01)

(58) Field of Classification Search
CPC .............................. G06F 17/18; G01J 1/4204
USPC ......................... 702/181, 150, 159
See application file for complete search history.

(56) References Cited

U.S. PATENT DOCUMENTS

| | | | | |
|---|---|---|---|---|
| 6,658,138 | B1* | 12/2003 | Gu ..................... | G06K 9/2018 382/108 |
| 2008/0069438 | A1* | 3/2008 | Winn .................. | G06K 9/4638 382/160 |
| 2008/0146153 | A1 | 6/2008 | Grosspietsch et al. | |
| 2008/0179497 | A1 | 7/2008 | Maniam et al. | |
| 2009/0227287 | A1 | 9/2009 | Kotidis | |
| 2009/0309711 | A1* | 12/2009 | Adappa ................. | G06Q 30/02 340/501 |
| 2010/0102229 | A1 | 4/2010 | Klinghult et al. | |

(Continued)

FOREIGN PATENT DOCUMENTS

| | | |
|---|---|---|
| CN | 1783956 A | 6/2006 |
| CN | 101210846 A | 7/2008 |
| CN | 101523619 A | 9/2009 |
| WO | 2012092956 A1 | 7/2012 |

OTHER PUBLICATIONS

International Search Report and Written Opinion—PCT/US2014/021039—ISA/EPO—dated Jun. 25, 2014.

(Continued)

Primary Examiner — Eman Alkafawi
(74) Attorney, Agent, or Firm — Kilpatrick Townsend & Stockton, LLP (57) ABSTRACT

A method of performing context inference is described. The method includes collecting ambient light at a spectrometer sensor integrated in a portable device, characterizing the collected light to obtain optical information, comparing the optical information to optical data predetermined to match one or more contexts, inferring at least one characteristic of a specific context based on the comparison, and determining a probability that the portable device is in the specific context.

26 Claims, 5 Drawing Sheets

(56) References Cited

U.S. PATENT DOCUMENTS

| | | |
|---|---|---|
| 2010/0159980 A1 | 6/2010 | Mikan et al. |
| 2010/0332475 A1* | 12/2010 | Birdwell ........... G06F 17/30333 707/737 |
| 2011/0086676 A1 | 4/2011 | Choi et al. |
| 2011/0245637 A1 | 10/2011 | McKenna |
| 2011/0261370 A1* | 10/2011 | Floyd ................. G01J 3/26 356/614 |
| 2012/0001841 A1* | 1/2012 | Gokingco ............ G01J 1/32 345/102 |
| 2012/0056911 A1* | 3/2012 | Safaee-Rad .......... G09G 3/2003 345/690 |
| 2012/0195460 A1* | 8/2012 | Lawrence Ashok Inigo .................... G06T 19/006 382/103 |
| 2013/0293116 A1* | 11/2013 | Carreras Molins .............. H05B 33/0872 315/152 |
| 2014/0172366 A1* | 6/2014 | Hannebutte ........ G06K 9/00496 702/181 |
| 2014/0293091 A1* | 10/2014 | Rhoads ................... G01J 3/513 348/234 |

OTHER PUBLICATIONS

Schmidt A., et al., "There is more to context than location," Computer & Graphics, Dec. 1, 1999 (Dec. 1, 1999), vol. 23 (6), pp. 893-901.

* cited by examiner

SPECTROMETER FOR PERSONAL CONTEXT

TECHNICAL FIELD

This application relates to methods of using a spectrometer, and more particularly to methods of using a spectrometer to determine personal context.

BACKGROUND

Users of smartphones and other mobile devices often want to know about their context or surroundings. For example, a user may want to determine their location, whether the immediate environment includes natural or artificial light, or whether a particular device, such as a TV, radio, or microwave is nearby. In addition, smartphone applications can leverage contextual information to provide additional services, or enhanced services, to the user. A smartphone operating system itself can use contextual information to better manage system resources. For example, if the environment around the device is relatively static, then some operations can be delayed, saving precious battery power.

Mobile devices collect optical information through sensors, such as an ALS (ambient light sensor) and a camera, which can include an RGB (red, green, blue) sensor. The ALS sensor senses surrounding light levels and typically adjusts the brightness of a display, e.g., a screen. Thus, an ALS sensor does not provide a user with much information regarding his surroundings. A camera, on the other hand, captures light information to produce an image, but uses a lot of power. Thus, it is not currently practical to have a camera always running to determine the environment of a user.

Accordingly, a need exists for a simple and low power sensor to determine user context.

SUMMARY

To address this need in the art, a spectrometer is included in a portable device, e.g., a mobile device such as a smartphone. A spectrometer can use light information to infer context of a user. A spectrometer does not collect images, but characterizes the frequency spectrum of light. By determining the characteristics of light, a spectrometer can provide valuable information regarding a user's location and surroundings at much lower power consumption than conventional cameras.

A method of performing context inference is disclosed that includes collecting ambient light at a spectrometer sensor integrated in a portable device, characterizing the collected light to obtain optical information, comparing the optical information to optical data predetermined to match one or more contexts, inferring at least one characteristic of a specific context based on the comparison, and determining a probability that the portable device is in the specific context. In other embodiments, the method includes training a machine learning system. The training includes positioning a spectrometer sensor in a specific context, choosing one or more desired ranges of frequencies in the specific context, receiving optical data from the spectrometer sensor, and linking the optical data to the specific context. Collected optical information may then be submitted to the machine learning system for comparison.

In contrast to traditional uses of spectrometers, the spectrometer in this disclosure does not collect the optical spectra of a physical object to determine, for example, the identity or composition of the object. Instead, the spectrometer is used to collect ambient light from a user's surroundings and determine the conditions of the user's environment. In this way, the spectrometer can derive an individual's context from the environment and detect significant changes in the individual's surroundings. Data obtained from the spectrometer may be made available to the user and may be combined with data obtained from other sensors to provide a more complete idea of the user's context.

DETAILED DESCRIPTION

The present disclosure provides systems and methods to determine whether a user with a portable device (e.g., a mobile computing device) having a spectrometer is currently located within a given context. By "context" is meant the surroundings and environment of the user, including, but not limited to, time, location, social environment, speed, direction, or combinations thereof. For example, the present methods can help determine whether the user is on the subway, with a group, and/or at lunch in a certain restaurant. The methods extract information of the surroundings by analyzing collected ambient light. The term "ambient light" as used herein means light in a user's surroundings, whether by natural or mechanical sources. Ambient light includes wavelengths all across the electromagnetic spectrum, including radio, microwave, infrared, visible, and ultraviolet.

Figure 1:
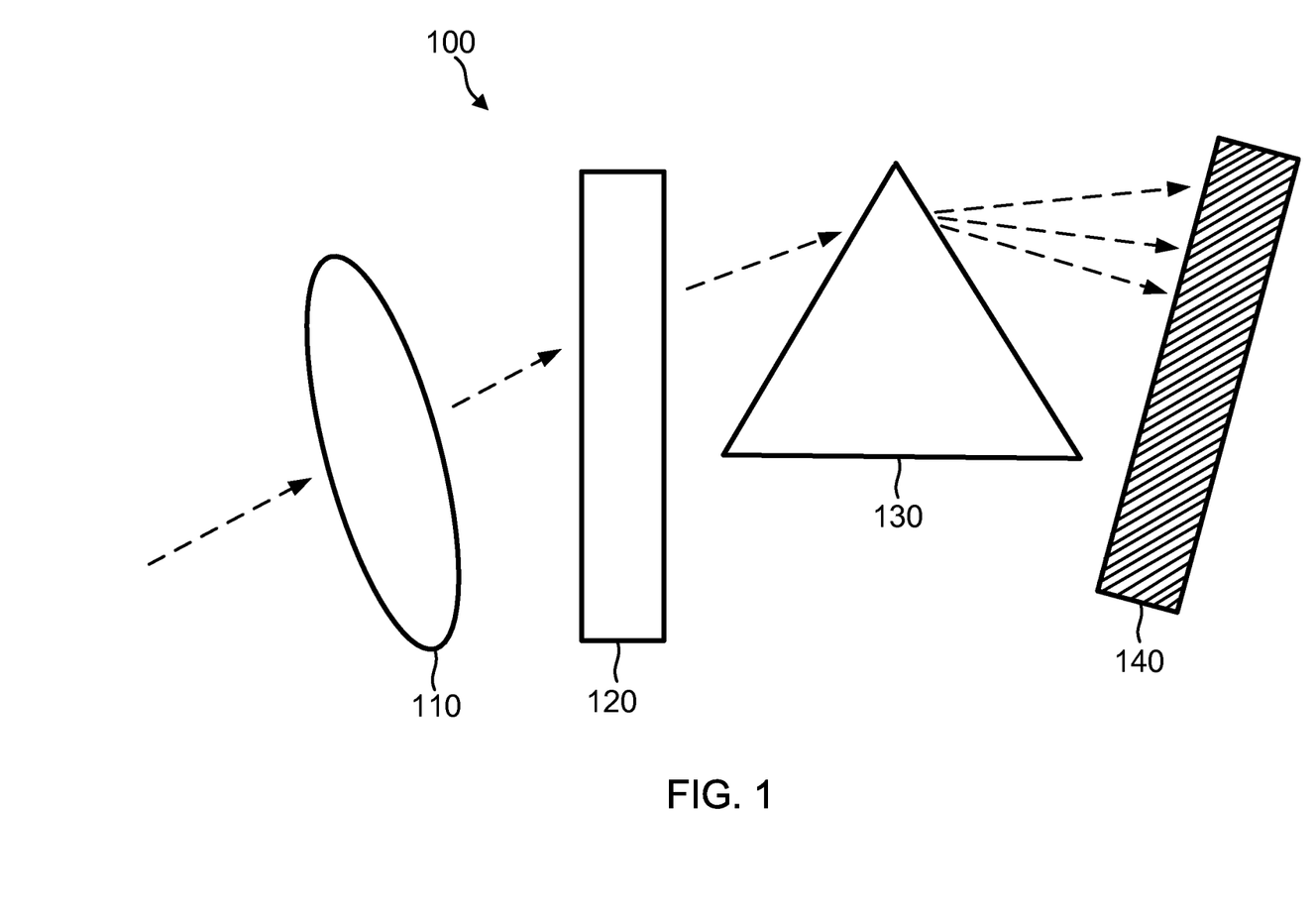
FIG. 1 is a diagram of a spectrometer sensor.

FIG. 1 illustrates an example embodiment of a spectrometer sensor 100. The spectrometer sensor 100 includes a lens 110 that collects ambient light from the environment, a frequency selector 120 that provides frequency selective filter 130 with a desired range of frequencies, a frequency selective filter 130 that passes frequencies within a certain range and rejects frequencies outside of that range, and a detector 140 that detects light of the desired frequency. The lens 110 can be a wide-angle lens so that the amount of light information that is received by the spectrometer sensor 100 is increased. As illustrated, filter 130 is a prism, but it should be understood that filter 130 may be any suitable wavelength selective element, including but not limited to a bandpass filter, a dispersive grating element, a linear variable filter, a color wheel, a tunable filter, or any other suitable types of one-dimensional (1-D) or two-dimensional (2-D) optical filters.

In operation, ambient light passes through lens 110 and selector 120, and enters filter 130, where it is split into its component wavelengths. The wavelengths are reflected onto detector 140, which picks up the individual wavelengths. The spectrometer sensor 100 is capable of acquiring optical information of the environment, which can then be collected, transmitted, and processed.

The spectrometer sensor 100 is integrated into a portable device (e.g., handheld devices such as PDAs, MP3 players, PMP players and mobile phones, watch-like devices, pen-like devices, etc.), thus forming a device having spectroscopic sensing and information transmitting/receiving capabilities. The spectrometer sensor 100 is embodied as a portable device so that it can be used in any location, transported from one place to another and placed wherever necessary.

The ambient light collected by the spectrometer sensor 100 may be processed by a microprocessor embedded in the portable device or transmitted to a separate server for further analysis. The portable device may also be used to download data or programs from the separate server for processing the optical information obtained by the spectrometer sensor 100.

Figure 2:
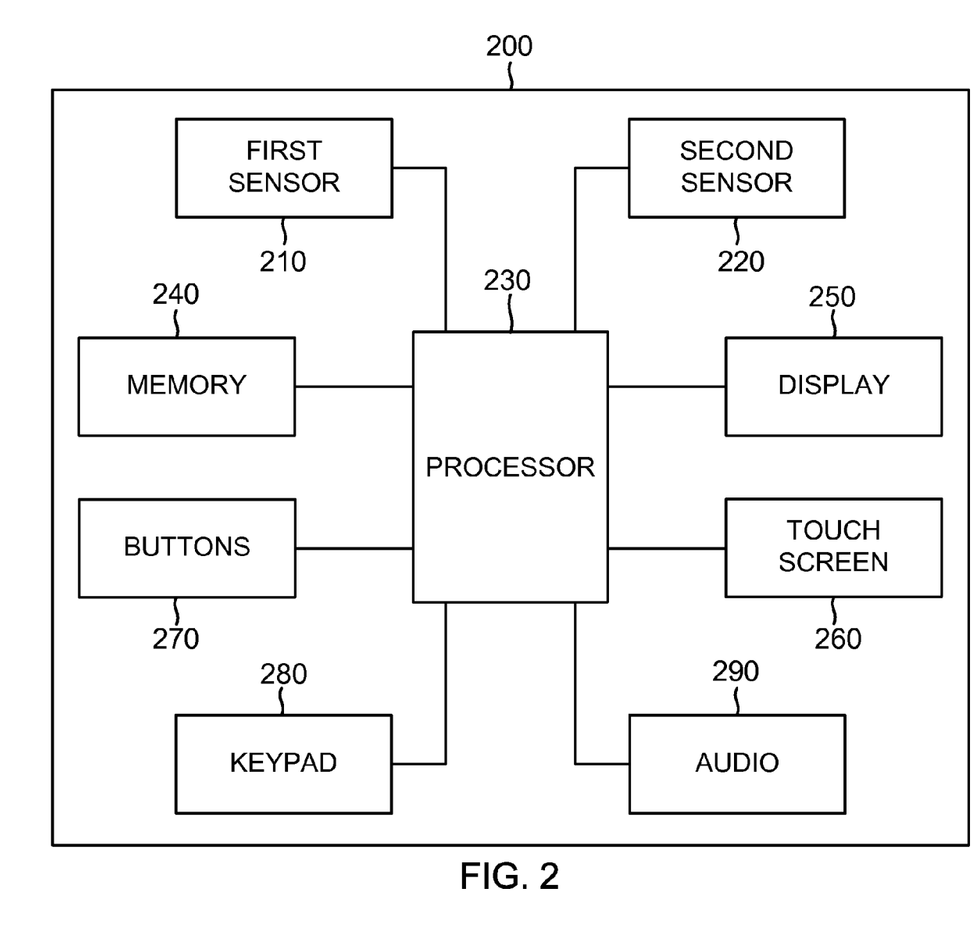
FIG. 2 is a schematic block diagram of a portable device.

FIG. 2 is a schematic block diagram of a portable device 200 according to a particular embodiment. The portable device 200 may house a first sensor 210, a second sensor 220, a processor 230, memory 240 and a display 250. In one particular implementation, the first sensor 210 includes a spectrometer sensor. Although only two sensors are shown in FIG. 2, it should be appreciated that additional, or fewer, sensors may be utilized in other implementations without deviating from the present disclosure. In some examples, the portable device 200 may include multiple sensors performing continuous real-time sensing of various parameters (e.g., device location, acceleration, rotation, speed, etc.). The portable device 200 may also include devices and circuitry to accept operator input and provide output data including a touch screen 260 integrated with the display 250, one or more buttons 270, one or more keypads 280 and/or an audio device 290 (such as a speaker and/or a microphone).

A server coupled to the portable device 200 over a network may be configured to receive information from the first sensor 210 and second sensor 220. The server may also be configured to perform computations that perform context inference and allow the portable device 200 to perform functions properly.

User context can be determined by receiving information output by a sensor or multiple sensors coupled to the portable device 200. In one example, information received from one sensor may be enough to determine that the portable device 200 is currently within a specific context. In another example, multiple sensors may be needed. In this embodiment, the optical information obtained from the spectrometer sensor is just one piece of information used to determine user context.

Figure 3:
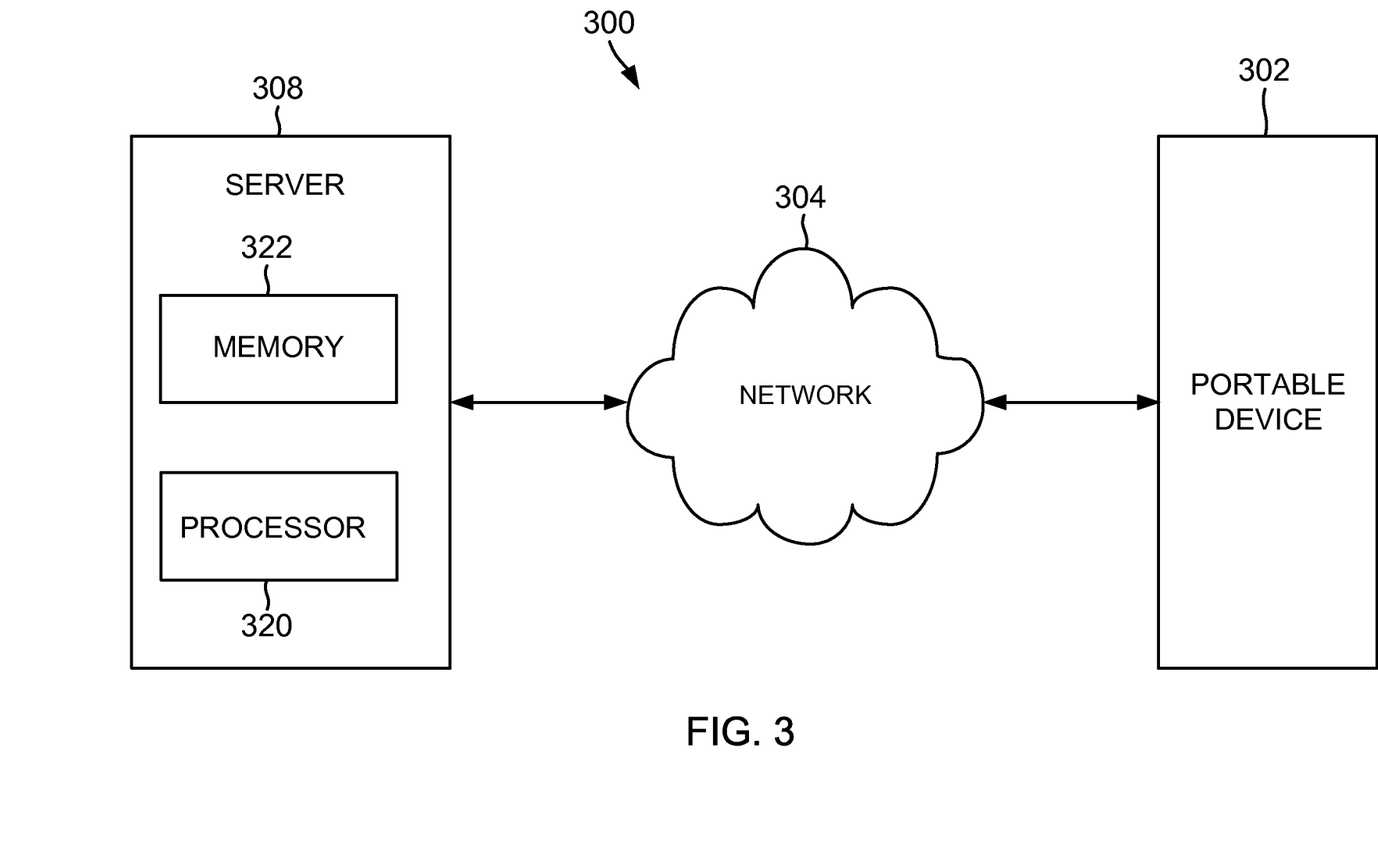
FIG. 3 is a diagram of a system for performing context inference in accordance with an embodiment of the disclosure.

FIG. 3 shows an exemplary communication system 300 through which a portable device 302 (e.g., the portable device 200) communicates with a server 308 according to the methods described herein. The system 300 includes a portable device 302 that communicates with the server 308 via a network 304. The server 308 operates to provide services to the portable device 302. The server 308 includes a processor 320 and a memory 322. Optical data predetermined to match one or more contexts, and one or more of the method steps described herein may be stored in the memory 322. Further, the processor 320 may act as a means for executing the one or more method steps stored in the memory 322.

Figure 4:
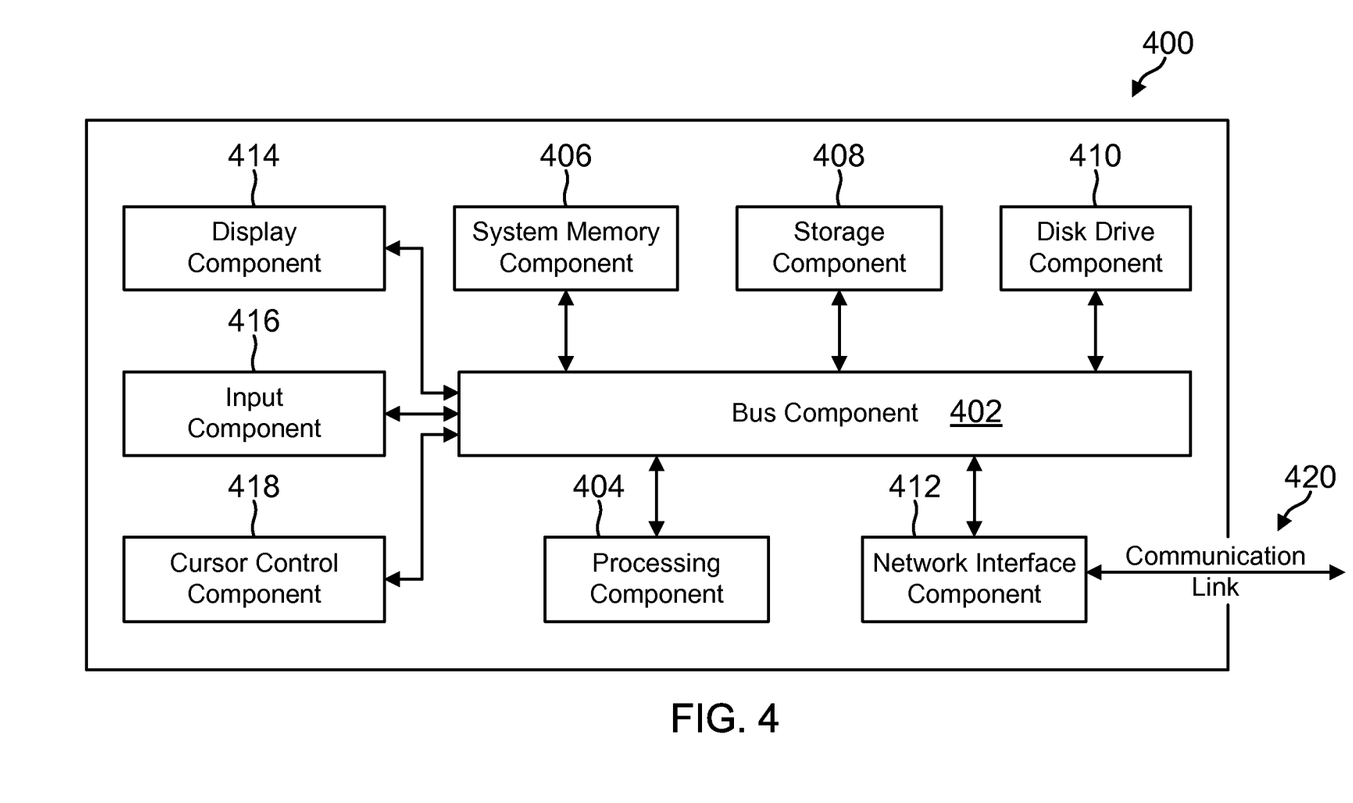
FIG. 4 is a block diagram of a computer system suitable for implementing one or more components in FIG. 3.

FIG. 4 is a block diagram of a system 400 suitable for implementing embodiments of the present disclosure, including portable device 200 and 302, and server 308. System 400, such as part of a cell phone, mobile phone, smart phone, personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to collect and characterize ambient light, and determine probabilities regarding a specific context. In other embodiments, hard-wired circuitry may be used in place of or in combination with software instructions for implementation of one or more embodiments of the disclosure.

Logic may be encoded in a non-transitory computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store optical data predetermined to match a specific context. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 304 of FIG. 3, LAN, WLAN, PTSN, or various other wired or wireless networks) may perform instruction sequences to practice the disclosure in coordination with one another. System 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Figure 5:
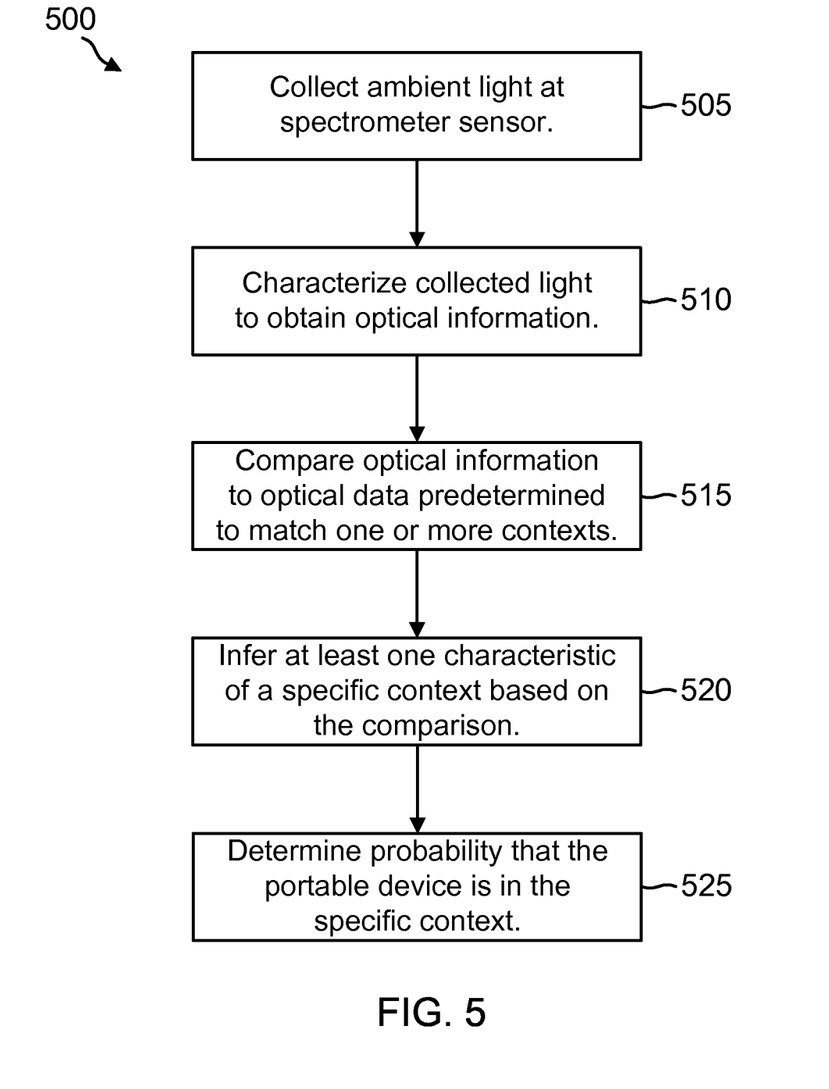
FIG. 5 is a flowchart for a method of performing context inference in accordance with an embodiment of the disclosure.

Referring now to FIG. 5, a method 500 of performing context inference according to an embodiment will now be described. In an initial step 505, ambient light is collected at a spectrometer sensor integrated in a portable device. A desired range of frequencies to collect may be selected. For example, the spectrometer sensor can be tuned to be receptive to wavelengths that are not visible to the naked eye, such as radio waves and microwaves to determine if a radio, television, or microwave is in the vicinity of the user. The spectrometer sensor can also be tuned to infrared wavelengths to identify the presence of other human beings in the area.

At step 510, the collected light is characterized to obtain optical information. The spectrometer sensor characterizes the collected ambient light by, for example, determining the intensity, patterns, and frequencies of the light. Different environments or contexts produce different light frequencies, intensities, and patterns. Using this principle, one can analyze ambient light from an unknown environment using the spectrometer sensor and compare the resulting optical information to optical data obtained from known environments.

At step 515, the obtained optical information is compared to optical data predetermined to match one or more contexts. Several predetermined light spectra corresponding to different specific situations or context classes (e.g., being in a specific room, being near a specific person, the time of day, the weather, etc.) may be used to perform a comparison with an obtained light spectrum, thus determining whether or not the user is in the same situation. Different spectral patterns may be recognized, such as patterns corresponding to a change in the weather conditions (for example, a sunlight change), the entering or leaving of a person within the area, detection of dynamic events such as people tracking (for example in buildings and hospitals) or object tracking (for example high valued objects in homes or museums) or other applications involving pattern recognition.

In one embodiment, to detect a person or object, a predetermined pattern based on the received spectral content for that particular person or object is stored. Then, whenever this pattern is recognized by the system as being a person or object present in a database, a notification can be sent to the user that the person or object is present. Furthermore, movement of an object or a person can also be detected by adding other characteristics such as how fast the light spectrum changes, or if it changes from one type to another type. The information can also be gathered by comparing the spectra that the spectrometer sensor obtains on a particular space.

In addition, when any or a particular change in the ambient or environmental light of an area takes place, the spectrometer sensor can detect the change through a change in the spectrum of the ambient light. The changes in the light spectrum may be caused by a change in an ambient light found within the area (for example, a daylight change associated with the weather or with the time of the day, entering through a window inside the area, or the change of the on/off state of an artificial light such as a lamp, found in that area). Also, the presence of static or moving objects and people may also affect the environmental light spectrum of a part of an area. These different changes may be used to recognize different situations within the area and perform actions according to the changes. The change of the light spectrum in an area may be caused by a change in the light coming from outside the area (e.g. the sunlight, a flash of an artificial light coming from another space, etc.), an intentionally done change (someone aiming a flashlight towards an spectrometer), or, for example, the entrance of people into the room, or their movement around the room.

At step 520, at least one characteristic of a specific context is inferred from the comparison. For example, the least one characteristic can include location, time of day, social environment, etc.

At step 525, a probability that the portable devices in the specific context is determined. While optical information from just the spectrometer sensor may be sufficient to determine this probability, more sensors may be used to determine with increasing probability that the portable devices within the specific context. In some embodiments, the spectrometer sensor is further connected to a processing unit adapted to evaluate the probability.

Based on the information output by the spectrometer sensor, a first probability associated with a determination that the user is within the specific context may be determined or assigned. The probability may be a numerical value (e.g., 0.2 out of a range of values between 0 and 1) or may be a qualitative description (e.g., "low" or "high"). In some embodiments, a determination of whether the probability exceeds or crosses a certain threshold is made. The threshold may be associated with the level of certainty that the portable devices within the specific context. If the probability exceeds the threshold, the portable device may be determined to be within the specific context.

If the probability does not exceed the threshold, other contextual information may be gathered from other sensors, e.g., sensors on the portable device. Other sensors may include local sensors, i.e., co-located within the portable device, such as a motion sensor to determine movement, an audio sensor to determine sound, a barometric pressure sensor to measure atmospheric pressure, a geomagnetic sensor to determine the direction of the Earth's magnetic field, a biometric sensor to measure heart rate or blood pressure, a touch sensor to detect touch or a fingerprint, an accelerometer to sense the direction of gravity and any other linear force experienced by the user, a gyroscope used to measure a Coriolis effect, heading changes and rotation, a temperature sensor to determine temperature, and a humidity sensor to determine humidity. The other sensors may also include non-local sensors, i.e., sensors not co-located on the portable device, such as sensors to determine calendar appointments or email messages. Based on the information output by the other sensors, a second probability associated with the determination that the user is within a specific context may be calculated.

In certain embodiments, the first probability and the second probability are combined to determine a combined probability. For example, determining the combined probability may comprise adding the first probability and second probability. A weighted combination of the first probability and the second probability may also be determined.

If the combined probability exceeds a second threshold, then the user may be determined to be within the specific context with a higher level of certainty. More sensors may be used until the combined probability exceeds a predetermined threshold and the user may be determined to be within the specific context with a predetermined high level of certainty. Once the probability is determined, it may be outputted or provided to the user.

As a specific example, determining that the device is within a given context (e.g., an environment and location of the device such as in a pocket of a user, in a hand of a user, inside a backpack, on a hip of a user, arm mounted, in a conference room, in a moving vehicle, etc.) may allow the settings on the portable device to be modified. The settings can include power, user interface, voicemail, email, text, Wi-Fi scanning, or combinations thereof. In some embodiments, modifying the settings includes lowering power or memory use, deferring notifications, or combinations thereof. The settings are typically modified if the probability that the portable device is within a specific context crosses a threshold value, and the user may be notified.

There are a wide variety of ways that the probabilities described herein can be used to output a context class or form a context declaration. For example, if the probability that the portable device is in a first specific context closely matches the probability that the portable device is in a second specific context, an "unknown decision" can be output. If the probability that the portable device is in one specific context exceeds all other probabilities, the context class can be output.

The portable device may be configured to run in a manner tailored for the specific context. A portable device, e.g., a mobile phone, which determines the specific context of the portable device to be a conference room with many people may reject or ignore incoming calls, for example. In another example, a user may not be benefiting from operation of a Global Positioning System (GPS) module or Wi-Fi scanning while the portable device is in the pocket of the user. If the portable device determines that the portable device may be in a pocket of a user, the device may disable the GPS antenna/module and Wi-Fi scanning to save power. In yet another example, if the portable device determines that the user is in the bedroom and asleep, email and voicemail notifications may be deferred until the morning. Determining that the portable device is within a specific context may allow the portable device to disable sensors consuming power when the specific context may be unsuitable. The portable device may also enable sensors and features upon detecting suitability of the specific context.

In one embodiment, a machine learning system, e.g., system 400, is trained. Machine learning involves algorithms or techniques that enable a computer to learn from data. Machine learning includes a process of training a computer algorithm with test data. The algorithm is trained with known inputs and learns these patterns through one or more statistical methods. The algorithm can then properly classify new input based on the inputs it has seen during training. The algorithm must be able to perform accurately on new, unseen examples after having trained on a learning data set.

In the present disclosure, training includes positioning a spectrometer sensor in a specific context, choosing one or more desired ranges of frequencies in the specific context, receiving optical data from the spectrometer sensor, and linking the optical data to the specific context. For example, ambient light from a living room during winter at 3:30 pm may be collected successively for a week. This is the known input that is provided to the algorithm. Once the system is trained to recognize this specific context, new inputs are provided. Ambient light is collected, the collected light is characterized to obtain optical information, and the optical information is submitted to the machine learning system. The system determines how good a match there is between the new optical information and the optical information of the specific context used to train the system. A probability that the portable device is in the specific context can then be determined, and in some cases, provided to the user. This probability may be combined with a probability determined from the input of other sensors.

The present disclosure provides the use of simple, low-cost, and low power spectrometers on portable devices for context awareness applications. The methods described herein allow the use of light information for context at a much lower power consumption than conventional cameras. This is because spatial resolution of light is not required, and thus the sensor can be made with a fraction of the pixels typically needed for a camera. Also, the time required for scanning is more relaxed than for a camera, since time delays translate to blurring in traditional cameras.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of performing context inference on a portable device, comprising:
    collecting ambient light at a spectrometer sensor of the portable device;
    characterizing the collected ambient light to obtain optical frequency information corresponding to a frequency spectrum of the collected ambient light;
    selecting a first context from one or more contexts based on the optical frequency information, each of the one or more contexts associated with a different frequency spectrum;
    determining, based on the optical frequency information, a first probability that the mobile device is within the selected first context;
    determining whether the first probability meets a first threshold;
    upon determining that the first probability does not meet the first threshold, collecting other contextual information of the portable device, the other contextual information gathered using one or more sensors other than the spectrometer sensor;
    determining a second context based on the other contextual information; and
    modifying an operation of the portable device based, at least in part, on the second context to enable the portable device to perform an operational task based on the modified operation.

2. The method of claim 1, wherein the modifying includes enabling or disabling a function of the portable device.

3. The method of claim 1, wherein the one or more sensors comprise local and/or nonlocal sensors.

4. The method of claim 1, wherein determining the second context comprising combining the other contextual data with the optical frequency information.

5. The method of claim 1, further comprising outputting a context class.

6. The method of claim 1, wherein the selected first context comprises a time, location, social environment, speed, direction, or combinations thereof.

7. The method of claim 1, further comprising modifying settings of the portable device based, at least in part, on the first probability.

8. The method of claim 7, wherein the settings are modified if the probability crosses a threshold value.

9. The method of claim 7, wherein the settings comprise power, user interface, voicemail, email, text, or Wi-Fi scanning settings, or a combination thereof.

10. The method of claim 9, wherein modifying the settings comprises lowering power or memory use, deferring notifications, or combinations thereof.

11. The method of claim 1, wherein the modifying includes enabling or disabling a component of the portable device.

12. The method of claim 1, further comprising:
    determining a change in frequency spectrum of ambient light collected by the spectrometer sensor including comparing the optical frequency information to stored information, the stored information corresponding to a previously determined frequency spectrum; and determining whether there is a difference between the optical frequency information and the stored information, wherein the selecting of the first context is based upon determining that there is a difference between the optical frequency information and the stored information.

13. The method of claim 12, further comprising:
determining a difference in time between when the ambient light is collected for obtaining the optical frequency information and when ambient light is collected for obtaining the stored information, wherein the selecting of the first context is based upon the difference in time.

14. The method of claim 1, further comprising: identifying, based, at least in part, on the optical frequency information, an object; and wherein the modifying the operation of the portable device is based, at least in part, on the identifying the object.

15. The method of claim 14, wherein the object is identified based on a comparison between the optical frequency information and a predetermined optical frequency pattern.

16. The method of claim 1, further comprising:
determining, based on the other contextual information, a second probability that the mobile device is within the second context;
wherein modifying an operation of the portable device based, at least in part, on the second context comprises:
based on a determination that the second probability exceeds the first probability, modifying the operation of the portable device based on the second context.

17. The method of claim 1, further comprising:
collecting electromagnetic emissions at a spectrometer sensor of the portable device, wherein the electromagnetic emissions include the ambient light and non-visible electromagnetic emissions; and
wherein the optical frequency information includes frequency information corresponding to the ambient light and the non-visible electromagnetic emissions.

18. The method of claim 17, wherein the non-visible electromagnetic emissions include radio waves.

19. The method of claim 1, wherein the optical frequency information includes information corresponding to infrared light of the collected ambient light.

20. A non-transitory machine-readable medium comprising a plurality of machine-readable instructions which, when executed by one or more processors, are adapted to cause the one or more processors to perform a method on a portable device comprising:
collecting ambient light at a spectrometer sensor of the portable device;
characterizing the collected ambient light to obtain optical frequency information corresponding to a frequency spectrum of the collected ambient light;
selecting a first context from one or more contexts based on the optical frequency information, each of the one or more contexts associated with a different frequency spectrum;
determining a first probability that the mobile device is within the selected first context;
determining whether the first probability meets a first threshold;
upon determining that the first probability does not meet the first threshold, collecting other contextual information of the portable device, the other contextual information gathered using a sensor other than the spectrometer sensor; determining a second context based on the other contextual information; and
modifying an operation of the portable device based, at least in part, on the second context to enable the portable device to perform an operational task based on the modified operation.

21. A mobile device comprising:
a spectrometer sensor;
a memory device storing optical frequency data associated with one or more contexts; and
one or more processors coupled to the memory device and operable to:
collect ambient light at the spectrometer sensor;
characterize the collected ambient light to obtain optical frequency information corresponding to a frequency spectrum of the collected ambient light;
select a first context from one or more contexts based on the optical frequency information, each of the one or more contexts associated with a different frequency spectrum;
determine a first probability of a level of certainty that the mobile device is within the selected first context;
determine whether the first probability meets a first threshold;
upon determining that the first probability does not meet the first threshold, collect other contextual information of the portable device, the other contextual information gathered using a sensor other than the spectrometer sensor;
determine a second context based on the other contextual information; and
modify an operation of the mobile device based, at least in part, on the second context to enable the portable device to perform an operational task based on the modified operation.

22. The mobile device of claim 21, wherein the modifying includes enabling or disabling a function of the mobile device.

23. The mobile device of claim 21, wherein the one or more processors is further operable to collect and combine other contextual data with the optical frequency information.

24. A system for performing context inference on a portable device, comprising:
means for collecting ambient light at a spectrometer sensor of the portable device;
means for characterizing the collected ambient light to obtain optical frequency information corresponding to a frequency spectrum of the collected ambient light;
means for selecting a context from one or more contexts based on the optical frequency information, each of the one or more contexts associated with a different frequency spectrum;
means for determining a first probability that the mobile device is within the selected first context;
means for determining whether the first probability meets a first threshold;
means for, upon determining that the first probability does not meet the first threshold, collecting other contextual information of the portable device, the other contextual information gathered using a sensor other than the spectrometer sensor;
means for determining a second context based on the other contextual information; and
means for modifying an operation of the portable device based, at least in part, on the second context to enable the portable device to perform an operational task based on the modified operation.

25. The system of claim 24, wherein the means for modifying includes enabling or disabling a function of the portable device.

26. The system of claim 24, further comprising means for collecting and combining other contextual data with the optical frequency information.

\* \* \* \* \*